(12) United States Patent
Adkisson

(10) Patent No.: US 6,401,656 B1
(45) Date of Patent: Jun. 11, 2002

(54) DOGGY MASTER

(76) Inventor: Mark Adkisson, 907 Ragan St., Harrisburg, IL (US) 62946

( * ) Notice: Subject to any disclaimer, the term of this patent is extended or adjusted under 35 U.S.C. 154(b) by 0 days.

(21) Appl. No.: 09/778,833

(22) Filed: Feb. 8, 2001

(51) Int. Cl.[7] ............................ A01K 1/04; A01K 5/00
(52) U.S. Cl. ........................... 119/51.01; 119/787
(58) Field of Search ................ 119/51.01, 786, 119/787, 788, 789, 790, 791

(56) References Cited

U.S. PATENT DOCUMENTS 2,360,199 A * 10/1944 Cawley
3,810,445 A * 5/1974 Stadler .................... 119/26
5,165,365 A * 11/1992 Thompson ................ 119/61
5,732,659 A * 3/1998 Wiggins ................... 119/787

* cited by examiner

Primary Examiner—Thomas Price
(74) Attorney, Agent, or Firm—Patent & Trademark Services; Thomas Zack; Joseph H. McGlynn

(57) ABSTRACT

A pet securing system having a first auger shaft fixed in the ground with the shaft having arms to hold containers for food and water. Over the first shaft another enclosing second shaft is rotatably mounted and this second shaft may mount an umbrella and a tether for a pet.

8 Claims, 2 Drawing Sheets

DOGGY MASTER

BACKGROUND OF THE INVENTION

This invention relates to a pet securing system having a pole with arms used to hold food and water containers coupled with an overhead umbrella.

Devices that are used to secure pets are well known and have been used for many years. In one simple well known device, an anchor is screwed into the earth or ground and a chain extending from the anchor is attached to a collar of the pet.

One invention for a pet securing device has a pole placed in the ground and an umbrella attached to the top of the pole.

Another prior art pet related invention discloses an animal tethering device comprising a tubular rod with a pointed end which is placed in the ground.

Another invention discloses an auger for anchoring a post in the ground.

Still another invention discloses a three piece pet food and water dish.

DESCRIPTION OF THE PRIOR ART

Devices that are used to anchor a tethered pet to the ground are known. For example, U.S. Pat. No. 4,546,730 to Holland discloses a pet securing device which has a pole placed in the ground and an umbrella attached to the top of the pole.

U.S. Pat. No. 5,044,323 to Papak discloses an animal tethering device comprising a tubular rod with a pointed end which is placed in the ground.

U.S. Pat. No. 5,482,246 to Derkoski discloses an auger for anchoring a post in the ground.

U.S. Pat. No. 5,526,773 to Richardson discloses a three piece pet food and water dish.

In the present invention a pet securing system has an auger to hold a pole in the ground with the pole having arms to hold water and food containers. An umbrella may be secured to the top of the pole all as will be detailed in the specification that follows hereafter.

SUMMARY OF THE INVENTION

A pet securing system having a first auger shaft fixed in the ground with the shaft having arms to hold containers for food and water. Over the first shaft another enclosing second shaft is rotatably mounted and this second shaft may mount an umbrella and a tether for a pet.

It is the primary object of the present invention to provide for an improved pet securing system.

Another object is to provide for such a system in which a first shaft is secured to the ground by an end auger with an enclosing second shaft used to mount. an overhead umbrella.

A still further objective to provide for such a system in which containers for water and food are mounted to extend outwardly from the first shaft and above the ground.

These and other objects and advantages of the present invention will become apparent to readers from a consideration of the ensuing description and the accompanying drawings.

DESCRIPTION OF THE PREFERRED EMBODIMENT

Figure 1:
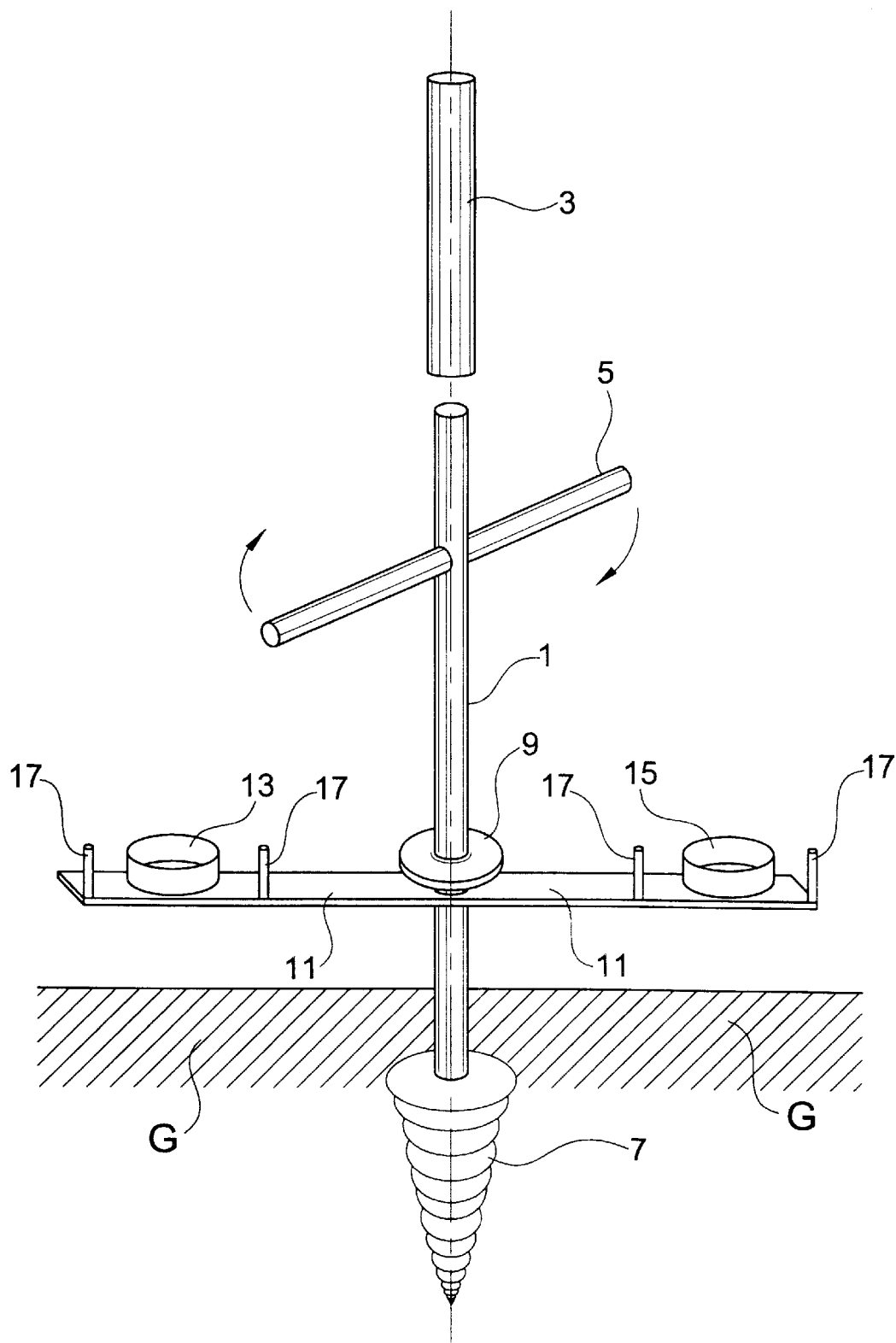
FIG. 1 is a perspective view of the auger shaft and related components of the present invention showing the upper bearing shaft before placed in the auger shaft.

FIG. 1 is a perspective view of the auger shaft 1 and related components of the present invention showing the upper hollow interior bearing shaft 3 before placed into the opened end of the auger shaft. As will be described in more detail with regard to FIG. 2, bearing shaft 3 acts as a bearing when a third umbrella supporting shaft is inserted over it. A hole in the first shaft 1 permits a removable rod 5 to be inserted completely through the shaft with exposed handle ends extending to both sides.

The rod 5 allows a user to twist the rod and rotate the shaft 3 and screw its lower auger shafted pointed end 7 into the earth or ground G to firmly anchor the shaft 1 in an upright position. After doing so, the rod 5 is removed and the bearing shaft 3 inserted into the opened top of auger shaft 1. If it is desired to remove the auger shaft 1, the process is reversed and the turning rod 5 reinserted and rotated in the opposite direction.

Welded to auger shaft 1 is a large diameter disk shaped washer 9. The washer 9 acts as a stop to prevent the shaft 1 from being placed too far into the ground when rotated. Immediately below the washer 9, and also welded to shaft 1, are outwardly extending supporting arms or platforms 11, which extend on opposite sides of shaft 1. Arms 11 are used to support, above the ground, two spaced containers 13 and 15 containing food and water, respectively, for the pet to eat and drink. Upstanding rims 17 on the arms/platforms 11 act to restrain the movement of the containers within designated areas on the surface of the arms.

Figure 2:
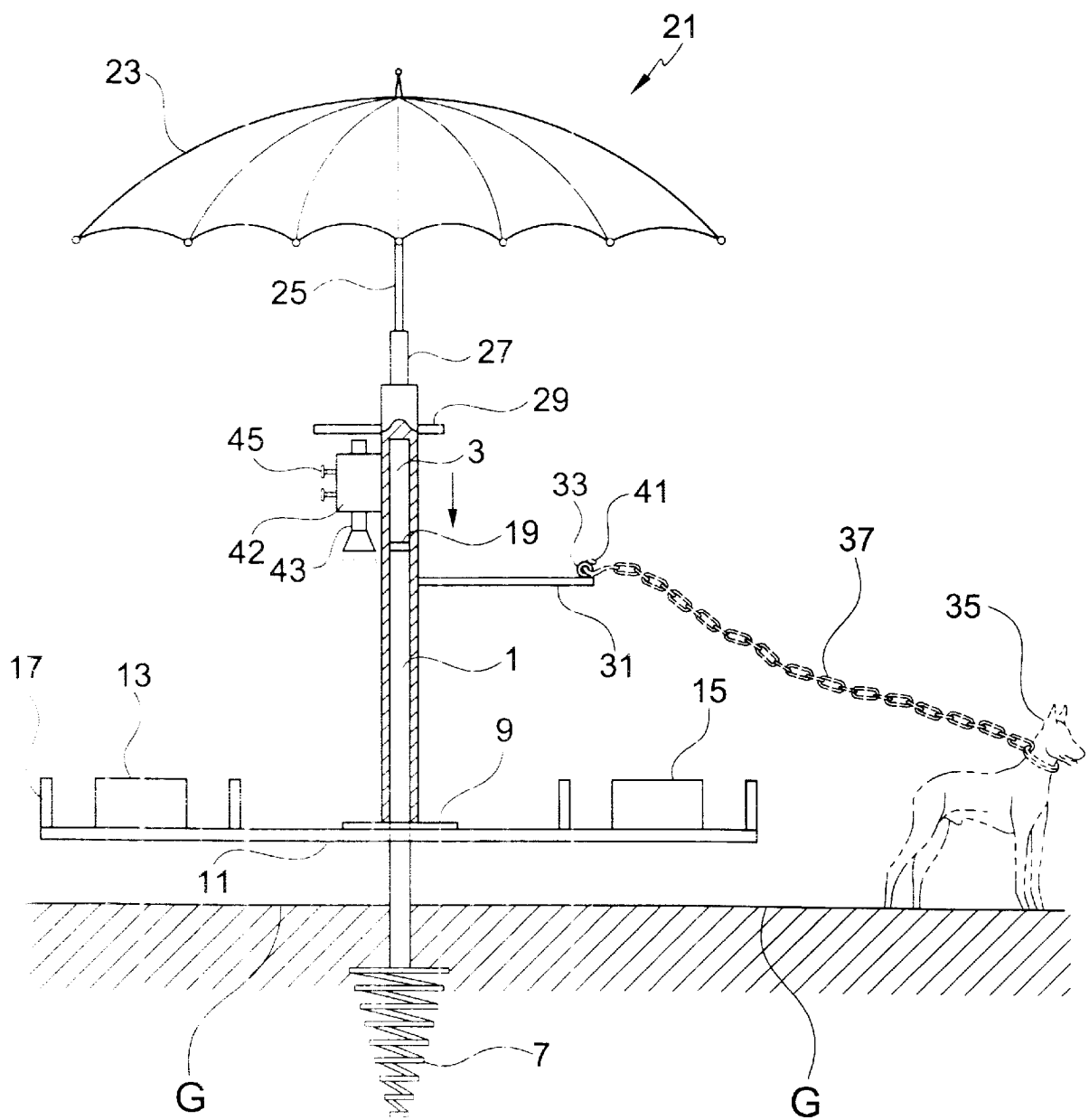
FIG. 2 is side view of the present invention with the front section of a second enclosing shaft removed to show the enclosed auger shaft of FIG. 1 in place with an added overhead umbrella system.

FIG. 2 is side view of the present invention with the front section of a second added shaft 19 removed to show how it encloses the first auger shaft 1 and upper bearing shaft 3 of FIG. 1. An added overhead umbrella system 21 is also shown. System 21 consists of an openable and closable umbrella canopy 23, shown in its opened state, a lower supporting pole 25 and a lower handle 27. Handle 27 extends into the body of the enclosing second shaft 19. A conventional fastener 29, such as pin and clip fastener, goes through a hole in the hollow interior of shaft 19 and a hole in the inserted umbrella handle 25 to prevent the umbrella from descending further into the sheath like shaft 19 and flying away with the wind. The top surface of the bearing shaft 3 engages the lower end 27 of the umbrella and acts to permit rotation of the umbrella about a vertical axis. The lower end surface of the second shaft 19 rests on, and is stopped from descending further by engaging washer 9 on shaft 1. With this arrangement, the outer shaft 19 is free to rotate around the fixed inner auger shaft 1.

In FIG. 2, the turning rod 5 (shown in FIG. 1) was previously used to screw center auger shaft 1 into the ground, and has now been removed. Normally, the outwardly extending arms or platforms 11 rest at the level of, or slightly elevated from, the ground G to both prevent the auger from being inserted further into the ground and, also to lessen the possibility of the confined water or food containers being tipped over by a pet when drinking or eating.

Welded to, or otherwise fixed to, rotatable shaft 19, above the platform 11, is an outwardly extending arm 31. A conventional eye hook 33, near the end of this arm, allows a collar on a dog or pet 35 to be connected to chain 37 (both shown in dotted line format). This will restrain movement of the pet relative to the shafts 1 and 19. An openable end fastener 41 on the chain engages the hook 33 and is conventional in design. As the pet circles the auger shaft 1, which is fixed in the ground, the outer sheath-like shaft 19 and its welded arm 31 rotate about the vertical axis of the fixed auger shaft 1. The platforms or arms 11 remain fixed in position relative to the shaft 1 while the upper umbrella 21 provides overhead protection for the pet from the sun, rain and other elements.

With this invention the pet may move around the fixed auger shaft and its platform since the second shaft 19, having the end of the tether fixed to it rotates with respect to the auger shaft. The pet is, at the same time, protected by the overhead canopy 21 and may eat or drink from the containers as desired.

Also, as shown in FIG. 2 an open sleeve 42 is secured to the shaft 19 in any conventional manner. At least one set screw 45 is threaded through the side of the sleeve 42. A conventional flashlight 43 can be inserted into sleeve 42 and secured therein by the screws 45. This will provide a convenient source of light for the user when attending to the pet at night.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A pet securing system comprising:

a first shaft insertable into the ground,
   said first shaft having, at a lower end, means for inserting said first shaft into the ground,
   said first shaft having outwardly extending arms,
containers mounted on said outwardly extending arms,
   said containers being adapted to hold food and water for a pet, and
an appendage attached to said first shaft,
   said appendage having means to tether a pet to said first shaft when said first shaft is inserted into the ground, and
   wherein said appendage comprises a second shaft mounted over said first shaft,
   said second shaft being rotatable with respect to the first shaft,
   said second shaft having a hollow interior portion, and
   an outwardly extending member having said means to tether a pet thereto.

2. The pet securing system as claimed in claim 1, wherein said outwardly extending arms have upstanding rims to restrict the movement of containers placed on the outwardly extending arms.

3. The pet securing system as claimed in claim 1, wherein a bearing is mounted in said first shaft and enclosed by said second shaft.

4. The pet securing system as claimed in claim 1, wherein said pet securing system also includes an umbrella system attached thereto,
   said umbrella system having a openable and closable umbrella canopy, and
   a lower supporting pole mounted on said first shaft,
   said lower supporting pole being engaged by securing means for retain the umbrella in place on the second shaft.

5. The pet securing system as claimed in claim 4, wherein said securing means includes a member extending through the second shaft,
   said member engages said supporting pole of the umbrella system.

6. The pet securing system as claimed in claim 1, wherein an illumination means for illuminating an area around said pet securing system is attached to said second shaft.

7. The pet securing system as claimed in claim 6, wherein a sleeve is secured to said second shaft, and said illumination means is secured in said sleeve.

8. The pet securing system as claimed in claim 7, wherein said illumination means is secured in said sleeve by at least one set screw which extends through said sleeve and engages said illumination means.

* * * * *

UNITED STATES PATENT AND TRADEMARK OFFICE
CERTIFICATE OF CORRECTION

PATENT NO.      : 6,401,656 B1
DATED           : June 11, 2002
INVENTOR(S)     : Mark Adkisson It is certified that error appears in the above-identified patent and that said Letters Patent is hereby corrected as shown below:

<u>Title page,</u>
Item [76], change the address of the inventor to read:
-- P.O Box 292
   Caveinrock, IL 62919 --

Signed and Sealed this

First Day of October, 2002

Attest:

Attesting Officer

JAMES E. ROGAN
Director of the United States Patent and Trademark Office